(12) United States Patent
Morito et al.

(10) Patent No.: US 11,088,543 B2
(45) Date of Patent: Aug. 10, 2021

(54) FAILURE DIAGNOSIS SYSTEM

(71) Applicant: TOSHIBA MITSUBISHI-ELECTRIC INDUSTRIAL SYSTEMS CORPORATION, Chuo-ku (JP)

(72) Inventors: Chikara Morito, Tokyo (JP); Hiromitsu Suzuki, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 125 days.

(21) Appl. No.: 16/473,406

(22) PCT Filed: Oct. 2, 2018

(86) PCT No.: PCT/JP2018/036889
§ 371 (c)(1),
(2) Date: Jun. 25, 2019

(87) PCT Pub. No.: WO2020/070804
PCT Pub. Date: Apr. 9, 2020

(65) Prior Publication Data
US 2021/0044108 A1 Feb. 11, 2021

(51) Int. Cl.
*H02J 1/06* (2006.01)
*H02H 7/125* (2006.01)
*H02H 7/20* (2006.01)

(52) U.S. Cl.
CPC .............. *H02J 1/06* (2013.01); *H02H 7/1255* (2013.01); *H02H 7/20* (2013.01)

(58) Field of Classification Search
None
See application file for complete search history.

(56) References Cited

U.S. PATENT DOCUMENTS

RE28,822 E * 5/1976 Fritts .................... H01H 47/002
361/105

FOREIGN PATENT DOCUMENTS

| JP | 3-273811 A | 12/1991 |
| JP | 2008-226620 A | 9/2008 |
| JP | 2016-192327 A | 11/2016 |
| JP | 2018-57218 A | 4/2018 |

OTHER PUBLICATIONS

International Search Report dated Dec. 4, 2018 in PCT/JP2018/036889 filed Oct. 2, 2018.

* cited by examiner

*Primary Examiner* — Rexford N Barnie
*Assistant Examiner* — Terrence R Willoughby
(74) *Attorney, Agent, or Firm* — Oblon, McClelland, Maier & Neustadt, L.L.P.

(57) ABSTRACT

A failure diagnosis system according to an embodiment includes a first power line, a second power line, a first main contact, a second main contact, a first electrical component, a second electrical component, and a control device. The first electrical component includes a first terminal electrically connected to a second part of the first power line and a second terminal electrically connected to a third part of the second power line. A state of the first electrical component is to be switched in a case where a voltage is applied between the first terminal and the second terminal. The control device is configured to determine whether an abnormality of the first main contact exists or not based on output of a control instruction relating to the first main contact and the state of the first electrical component.

4 Claims, 5 Drawing Sheets

FIG. 3

FAILURE DIAGNOSIS SYSTEM

TECHNICAL FIELD

An embodiment of the present invention relates to a failure diagnosis system.

BACKGROUND ART

A failure diagnosis system that diagnoses a failure of a main contact disposed between a power supply and a load is known.

Meanwhile, there are cases in which it is desirable to further improve the reliability of failure diagnosis in the failure diagnosis system as described above.

CITATION LIST

Patent Literature

[Patent Literature 1]
Japanese Unexamined Patent Application, First Publication No. 2018-057218.

SUMMARY OF INVENTION

Technical Problem

A technical problem to be solved by the present invention is to provide a failure diagnosis system capable of improving the reliability of failure diagnosis.

Solution to Problem

A failure diagnosis system according to an embodiment includes a first power line, a second power line, a first main contact, a second main contact, a first electrical component, a second electrical component, and a control device. The first power line includes a first part and a second part, the first part being to be electrically connected to a power supply, the second part being to be electrically connected to a load. The second power line includes a third part and a fourth part, the third part being to be electrically connected to the power supply, the fourth part being to be electrically connected to the load. The first main contact is disposed between the first part and the second part of the first power line. The second main contact is disposed between the third part and the fourth part of the second power line. The first electrical component includes a first terminal and a second terminal, the first terminal being electrically connected to the second part of the first power line, the second terminal being electrically connected to the third part of the second power line, a state of the first electrical component being to be switched in a case where a voltage is applied between the first terminal and the second terminal. The second electrical component includes a third terminal and a fourth terminal, the third terminal being electrically connected to the first part of the first power line, the fourth terminal being electrically connected to the fourth part of the second power line, a state of the second electrical component being to be switched in a case where a voltage is applied between the third terminal and the fourth terminal. The control device is configured to determine whether an abnormality of the first main contact exists or not based on output of a first control instruction relating to the first main contact and the state of the first electrical component, and to determine whether an abnormality of the second main contact exists or not based on output of a second control instruction relating to the second main contact and the state of the second electrical component.

DESCRIPTION OF EMBODIMENTS

Hereinafter, a failure diagnosis system according to an embodiment will be described with reference to the drawings. In the following description, the same reference signs will be assigned to components having the same function or functions similar to each other. Duplicate description of such components may be omitted.

First, several terms used in this specification will be defined. "Based on XX" stated in this specification means "at least based on XX" and also includes the case of being based on another element in addition to XX. In addition, "based on XX" is not limited to the case of directly using XX and also includes the case of being based on something that is acquired by an arithmetic operation or another process being performed on XX. Here, "XX" is an arbitrary element (for example, arbitrary information). "Connection" stated in this specification is not limited to the case of being physically connected and also includes the case of being electrically connected. "Line" (for example, a "line" such as a power line, a connecting line, or the like) stated in this specification does not mean an object extending in a linear form and broadly means a conductive part, in which a current flows, formed by one or a plurality of conductors. "In the middle of XX" stated in this specification does not mean a midpoint between both ends of XX and means an arbitrary position in XX.

Embodiment

Figure 1:
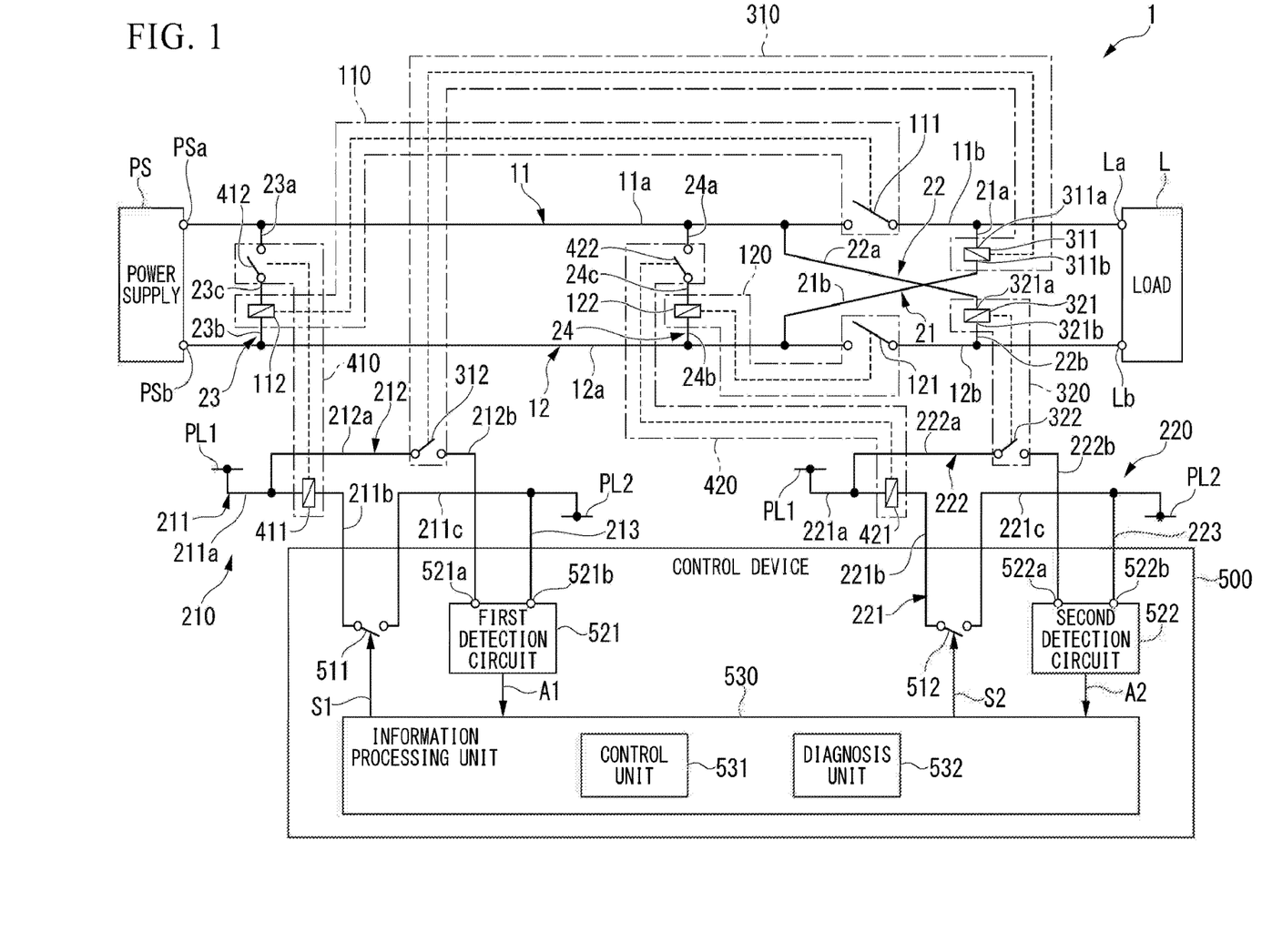
FIG. 1 is a configuration diagram illustrating a failure diagnosis system according to an embodiment.
Figure 2A:
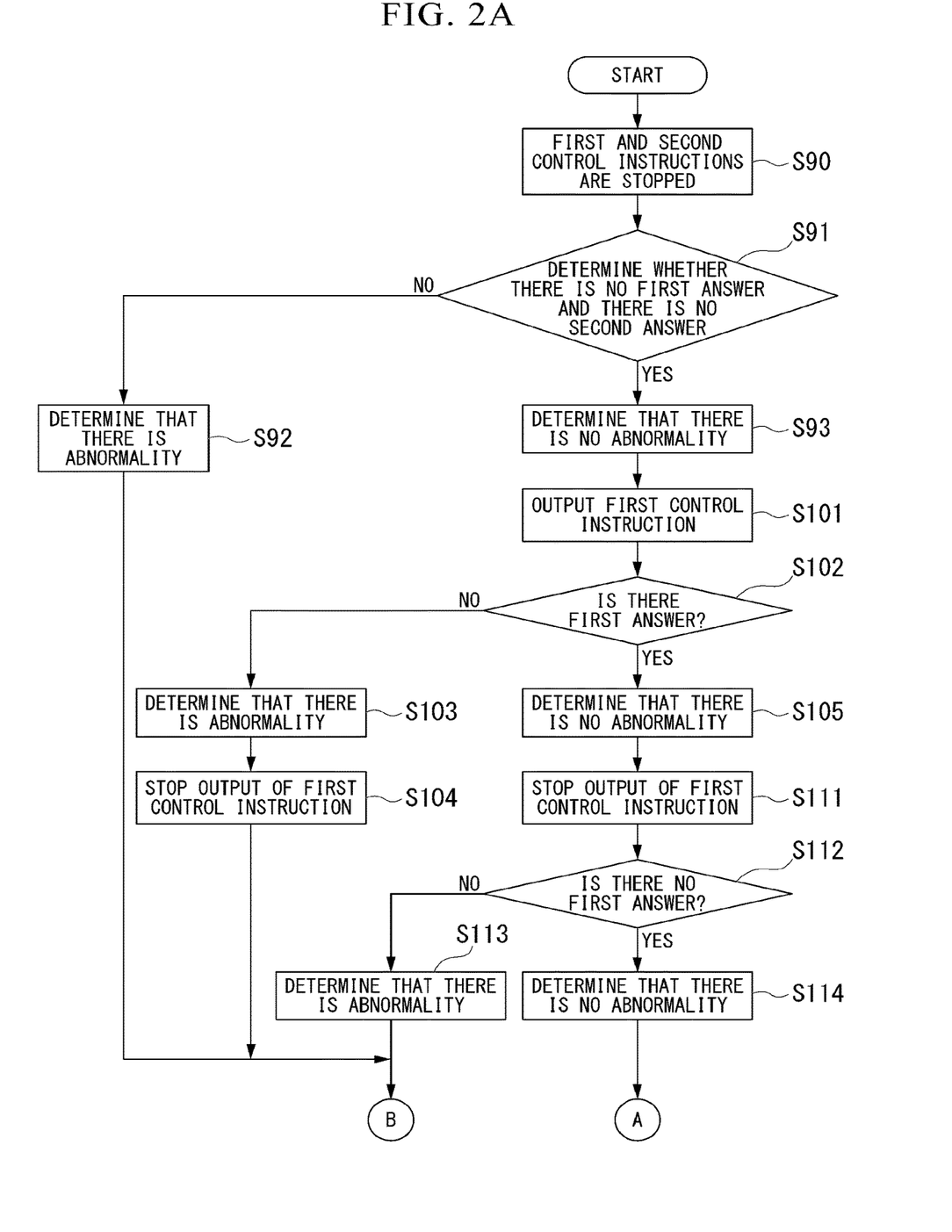
FIG. 2A is a flowchart illustrating a part of one example of the flow of a failure diagnosis operation according to the embodiment.
Figure 2B:
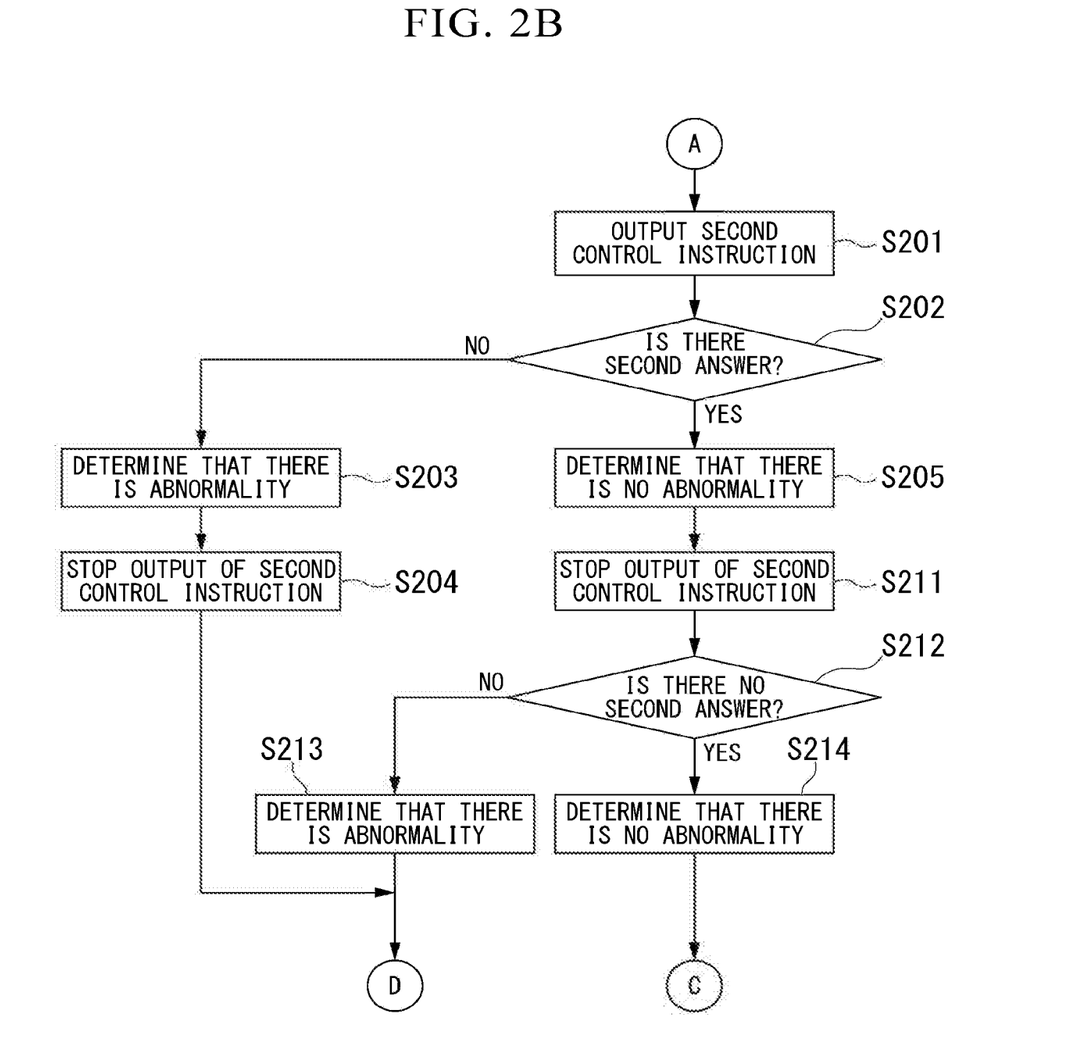
FIG. 2B is a flowchart illustrating a part of one example of the flow of the failure diagnosis operation according to the embodiment.
Figure 2C:
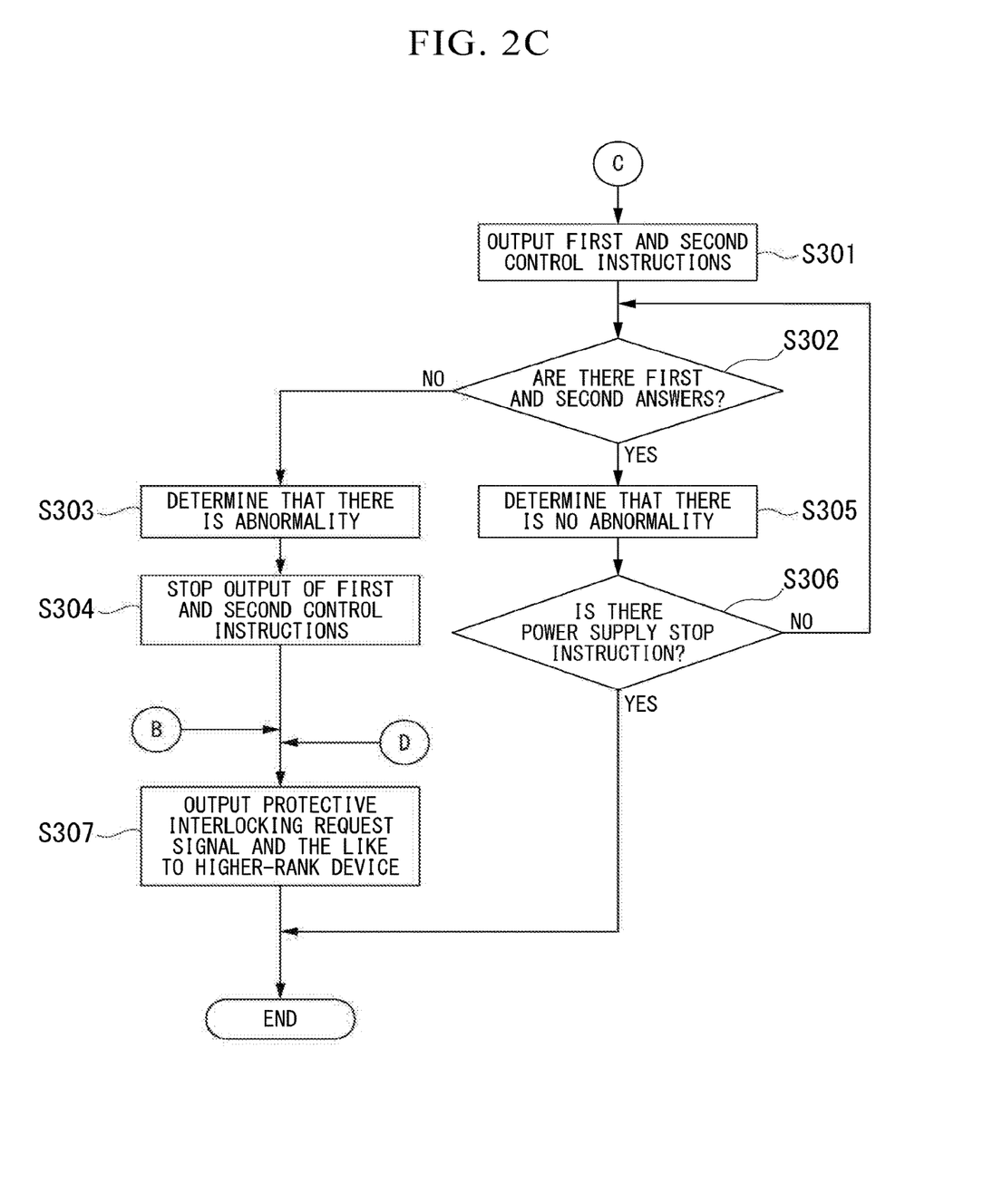
FIG. 2C is a flowchart illustrating a part of one example of the flow of the failure diagnosis operation according to the embodiment.

A failure diagnosis system 1 according to an embodiment will be described with reference to FIGS. 1 to 2C. FIG. 1 is a configuration diagram illustrating the failure diagnosis system 1. The failure diagnosis system 1 according to this embodiment, for example, is a system that diagnoses whether an abnormality exists or not in two main contacts 111 and 121 disposed between a power supply PS and a load L. The load L, for example, is a brake unit in an electric motor drive system. The brake unit, for example, opens a brake in an excitation state and operates the brake at the time of loss of supply of power (at the time of no excitation). The brake unit is one example of a "stopping device" and securely stops a device in a case where supply of power from the power supply PS is cut off. However, the load L is not limited to a brake unit and may be a device having a function other than that of a brake.

As illustrated in FIG. 1, the failure diagnosis system 1, for example, includes first and second power lines 11 and 12, first to fourth connecting lines 21, 22, 23, and 24, first and second contactors 110 and 120, first and second control circuits (operation circuits) 210 and 220, first and second diagnostic relays 310 and 320, first and second control relays (relays for opening/closing) 410 and 420, and a control device 500.

The first and second power lines 11 and 12 are disposed between the power supply PS and the load L. Described in more detail, one end of the first power line 11 is connected to a first terminal PSa of the power supply PS. The other end of the first power line 11 is connected to a first terminal La of the load L. On the other hand, one end of the second power line 12 is connected to a second terminal PSb of the power supply PS. The other end of the second power line 12 is connected to a second terminal Lb of the load L. The first and second power lines 11 and 12 are disposed electrically in parallel with each other, and currents in opposite directions flow therein. The first and second power lines 11 and 12 form a main circuit that supplies power from the power supply PS to the load L. Power supplied from the power supply PS to the load L through the first and second power lines 11 and 12 may be either DC power or AC power. The load L is mechanically connected to a rotation shaft of an electric motor, which is not illustrated in the drawing, that is a brake unit and the like. In a case where power is supplied to the load L from the power supply PS through the first and second power lines 11 and 12, the brake is released, and the electric motor can rotate. In a case where the supply of power through the first and second power lines 11 and 12 is cut off, the load L applies the brake to the electric motor. According to such a configuration, a so-called fail-safe configuration in which the brake operates when a failure such as power cutoff occurs is formed in the brake unit.

In this embodiment, the first power line 11 includes a first part 11a connected to the first terminal PSa of the power supply PS and a second part 11b connected to the first terminal La of the load L. A first main contact 111 (to be described later) included in the first contactor 110 is disposed between the first part 11a and the second part 11b.

Similarly, the second power line 12 includes a third part 12a connected to the second terminal PSb of the power supply PS and a fourth part 12b connected to the second terminal Lb of the load L. A second main contact 121 (to be described later) included in the second contactor 120 is disposed between the third part 12a and the fourth part 12b.

The first connecting line 21 is disposed between the second part 11b of the first power line 11 and the third part 12a of the second power line 12. Described in detail, the first connecting line 21 includes a first part 21a connected to the second part 11b of the first power line 11 and a second part 21b connected to the third part 12a of the second power line 12. A first coil 311 (to be described later) included in the first diagnostic relay 310 is disposed between the first part 21a and the second part 21b.

The second connecting line 22 is disposed between the first part 11a of the first power line 11 and the fourth part 12b of the second power line 12. Described in detail, the second connecting line 22 includes a first part 22a connected to the first part 11a of the first power line 11 and a second part 22b connected to the fourth part 12b of the second power line 12. A second coil 321 (to be described later) included in the second diagnostic relay 320 is disposed between the first part 22a and the second part 22b.

The third connecting line 23 is disposed between the first part 11a of the first power line 11 and the third part 12a of the second power line 12. Described in detail, the third connecting line 23 includes a first part 23a, a second part 23b, and a third part 23c. The first part 23a is connected to the first part 11a of the first power line 11. The second part 23b is connected to the third part 12a of the second power line 12. The third part 23c is positioned between the first part 23a and the second part 23b. A third contact 412 (to be described later) included in the first control relay 410 is disposed between the first part 23a and the third part 23c. A first main coil 112 (to be described later) included in the first contactor 110 is disposed between the third part 23c and the second part 23b. The arrangement of the third contact 412 and the first main coil 112 may be reversed.

Similar to the third connecting line 23, the fourth connecting line 24 is disposed between the first part 11a of the first power line 11 and the third part 12a of the second power line 12. The fourth connecting line 24 is disposed electrically in parallel with the third connecting line 23. Described in more detail, the fourth connecting line 24 includes a first part 24a, a second part 24b, and a third part 24c. The first part 24a is connected to the first part 11a of the first power line 11. The second part 24b is connected to the third part 12a of the second power line 12. The third part 24c is positioned between the first part 24a and the second part 24b. A fourth contact 422 (to be described later) included in the second control relay 420 is disposed between the first part 24a and the third part 24c. A second main coil 122 (to be described later) included in the second contactor 120 is disposed between the third part 24c and the second part 24b. The arrangement of the fourth contact 422 and the second main coil 122 may be reversed.

The first contactor 110 includes the first main contact 111 and the first main coil 112.

The first main contact 111 is a make contact (a so-called "a-contact") corresponding to the first main coil 112 and is in an open state (non-conductive state) when the first main coil 112 is not excited and is in a closed state (conductive state) when the first main coil 112 is excited. The first main contact 111 is disposed between the first part 11a and the second part 11b of the first power line 11 and switches a conduction state between the first part 11a and the second part 11b. For example, when the first main contact 111 is operated such that it is brought into a closed state, the state between the first part 11a and the second part 11b of the first power line 11 is caused to become a conductive state. In this case, the power supply PS and the load L are electrically connected through the first power line 11. On the other hand, when the first main contact 111 is operated such that it is brought into an open state, the state between the first part 11a and the second part 11b of the first power line 11 is caused to become a non-conductive state. In this case, electrical connection between the power supply PS and the load L using the first power line 11 is cut off.

The first main coil 112 is disposed in the middle of the third connecting line 23 and is excited in a case where the third contact 412 is switched to the closed state (conductive state).

The second contactor 120 includes the second main contact 121 and the second main coil 122.

The second main contact 121 is a make contact corresponding to the second main coil 122 and is in an open state (non-conductive state) when the second main coil 122 is not excited and is in the closed state (conductive state) when the second main coil 122 is excited. The second main contact 121 is disposed between the third part 12a and the fourth part 12b of the second power line 12 and switches a conduction state between the third part 12a and the fourth part 12*b*. For example, when the second main contact 121 is operated such that it is brought into a closed state, the state between the third part 12*a* and the fourth part 12*b* of the second power line 12 is caused to become a conductive state. In this case, the power supply PS and the load L are electrically connected through the second power line 12. On the other hand, when the second main contact 121 is operated such that it is brought into an open state, the state between the third part 12*a* and the fourth part 12*b* of the second power line 12 is caused to become a non-conductive state. In this case, electrical connection between the power supply PS and the load L using the second power line 12 is cut off.

The second main coil 122 is disposed in the middle of the fourth connecting line 24 and is excited in a case where the fourth contact 422 is switched to the closed state (conductive state).

The first control circuit 210 includes first to third control lines 211, 212, and 213.

The first control line 211 includes a first part 211*a*, a second part 211*b*, and a third part 211*c*. The first part 211*a*, for example, is connected to a first control power line PL1 outside the control device 500. The third part 211*e*, for example, is connected to a second control power line PL2 outside the control device 500. The first control power line PL1 and the second control power line PL2 are power lines forming a pair. The second part 211*b* is positioned between the first part 211*a* and the third part 211*c*. A third coil 411 (to be described later) included in the first control relay 410 is disposed between the first part 211*a* and the second part 211*b*. A first internal contact 511 (to be described later) included in the control device 500 is disposed between the second part 211*b* and the third part 211*c*.

The second control line 212 includes a first part 212*a* and a second part 212*h*. The first part 212*a* is connected to the first part 211*a* of the first control line 211 and is connected to the first control power line PL1 through the first part 211*a* of the first control line 211. In addition, the first part 212*a* may be directly connected to the first control power line PL1 instead of the first part 211*a* of the first control line 211 or may be connected to a different control power line. The second part 212*b* is connected to a first terminal 521*a* of a first detection circuit 521 (to be described later) included in the control device 500. A first contact 312 (to be described later) included in the first diagnostic relay 310 is disposed between the first part 212*a* and the second part 212*b*.

One end of the third control line 213 is connected to the second terminal 521*b* of the first detection circuit 521 included in the control device 500. The other end of the third control line 213 is connected to the third part 211*c* of the first control line 211 and is connected to the second control power line PL2 through the third part 211*c* of the first control line 211. In addition, the third control line 213 may be directly connected to the second control power line PL2 instead of the third part 211*c* of the second control line 212 or may be connected to a different control power line.

The second control circuit 220 includes fourth to sixth control lines 221, 222, and 223.

The fourth control line 221 includes a first part 221*a*, a second part 221*b*, and a third part 221*c*. The first part 221*a*, for example, is connected to the first control power line PL1 outside the control device 500. In addition, the first part 221*a* may be connected to a different control power line instead of the first control power line PL1. The third part 221*c*, for example, is connected to the second control power line PL2 outside the control device 500. In addition, the third part 221*c* may be connected to a different control power line instead of the second control power line PL2. The second part 221*b* is positioned between the first part 221*a* and the third part 221*c*. A fourth coil 421 (to be described later) included in the second control relay 420 is disposed between the first part 221*a* and the second part 221*b*. A second internal contact 512 (to be described later) included in the control device 500 is disposed between the second part 221*b* and the third part 221*c*.

The fifth control line 222 includes a first part 222*a* and a second part 222*b*. The first part 222*a* is connected to the first part 221*a* of the fourth control line 221 and is connected to the first control power line PL1 through the first part 221*a* of the fourth control line 221. In addition, the fifth control line 222 may be directly connected to the first control power line PL1 instead of the first part 221*a* of the fourth control line 221 or may be connected to a different control power line. The second part 222*b* is connected to a first terminal 522*a* of an second detection circuit 522 (to be described later) included in the control device 500. A second contact 322 (to be described later) included in the second diagnostic relay 320 is disposed between the first part 222*a* and the second part 222*b*.

One end of the sixth control line 223 is connected to a second terminal 522*b* of the second detection circuit 522 included in the control device 500. The other end of the sixth control line 223 is connected to the third part 221*c* of the fourth control line 221 and is connected to the second control power line PL2 through the third part 221*c* of the fourth control line 221. In addition, the sixth control line 223 may be directly connected to the second control power line PL2 instead of the third part 221*c* of the fourth control line 221 or may be connected to a different control power line.

The first diagnostic relay 310 includes a first coil 311 and a first contact 312.

The first coil 311 includes a first terminal 311*a* and a second terminal 311*b*. The first terminal 311*a* is connected to the first part 21*a* of the first connecting line 21 and is electrically connected to the second part 11*b* of the first power line 11 through the first part 21*a*. The second terminal 311*b* is connected to the second part 21*b* of the first connecting line 21 and is electrically connected to the third part 12*a* of the second power line 12 through the second part 21*b*. In a case where the first main contact 111 is in the closed state, and a voltage is applied between the first terminal 311*a* and the second terminal 311*b*, the first coil 311 is excited and switches the state of the first contact 312.

The first contact 312 is a make contact corresponding to the first coil 311 and is in the open state (non-conductive state) when the first coil 311 is not excited and is in the closed state (conductive state) when the first coil 311 is excited. By operating the first contact 312 to be in the closed state, the state between the first part 212*a* and the second part 212*b* of the second control line 212 is caused to become a conductive state. In this case, the first control power line PL1 and the first terminal 521*a* of the first detection circuit 521 are electrically connected through the first and second control lines 211 and 212. As a result, a current is input to the first terminal 521*a* of the first detection circuit 521. On the other hand, by operating the first contact 312 to be in an open state, the state between the first part 212*a* and the second part 212*b* of the second control line 212 is caused to become a non-conductive state. In this case, electrical connection between the first control power line PL1 and the first terminal 521*a* of the first detection circuit 521 is cut off. The first diagnostic relay 310 is one example of each of a "first electrical component" and a "first relay." The open/closed state of the first contact 312 is one example of "a state of a first electrical component."

The second diagnostic relay 320 includes a second coil 321 and a second contact 322.

The second coil 321 includes a third terminal 321a and a fourth terminal 321b. The third terminal 321a is connected to the first part 22a of the second connecting line 22 and is electrically connected to the first part 11a of the first power line 11 through the first part 22a. The fourth terminal 321b is connected to the second part 22b of the second connecting line 22 and is electrically connected to the fourth part 12b of the second power line 12 through the second part 22b. In a case where the second main contact 121 is in the closed state, and a voltage is applied between the third terminal 321a and the fourth terminal 321b, the second coil 321 is excited and switches the state of the second contact 322.

The second contact 322 is a make contact corresponding to the second coil 321 and is in the open state (non-conductive state) when the second coil 321 is not excited and is in the closed state (conductive state) when the second coil 321 is excited. The second contact 322 is disposed between the first part 222a and the second part 222b of the fifth control line 222 and switches a conduction state between the first part 222a and the second part 222b. For example, by operating the second contact 322 to be in the closed state, the state between the first part 222a and the second part 222b of the fifth control line 222 is caused to become a conductive state. In this case, the first control power line PL1 and the first terminal 522a of the second detection circuit 522 are electrically connected through the fourth and fifth control lines 221 and 222. As a result, a current is input to the first terminal 522a of the second detection circuit 522. On the other hand, by operating the second contact 322 to be in the open state, the state between the first part 222a and the second part 222b of the fifth control line 222 is caused to become a non-conductive state. In this case, electrical connection between the first control power line PL1 and the first terminal 522a of the second detection circuit 522 is cut off. The second diagnostic relay 320 is one example of a "second electrical component." The open/closed state of the second contact 322 is one example of "a state of a second electrical component."

The first control relay 410 includes a third coil 411 and a third contact 412.

When a first control instruction to be described later is output, and the first internal contact 511 of the control device 500 is brought into a closed state, the third coil 411 is excited and switches a state of the third contact 412.

The third contact 412 is a make contact corresponding to the third coil 411 and is brought into an open state (non-conductive state) when the third coil 411 is not excited and is brought into a closed state (conductive state) when the third coil 411 is excited. By operating the third contact 412 to be in the closed state, the first main coil 112 of the first contactor 110 is excited. In this case, by causing the first main contact 111 to be in the closed state, the first part 11a and the second part 11b of the first power line 11 are electrically connected. On the other hand, by operating the third contact 412 to be in the open state, the first main coil 112 is not excited. In this case, by causing the first main contact 111 to be in the open state, electrical connection between the first part 11a and the second part 11b of the first power line 11 is cut off. The first control relay 410 is one example of a "second relay."

The second control relay 420 includes a fourth coil 421 and a fourth contact 422.

When a second control instruction to be described later is output, and the second internal contact 512 of the control device 500 is brought into a closed state, the fourth coil 421 is excited and switches a state of the fourth contact 422.

The fourth contact 422 is a make contact corresponding to the fourth coil 421 and is brought into an open state (non-conductive state) when the fourth coil 421 is not excited and is brought into a closed state (conductive state) when the fourth coil 421 is excited. By operating the fourth contact 422 to be in the closed state, the second main coil 122 of the second contactor 120 is excited. In this case, by causing the second main contact 121 to be in the closed state, the third part 12a and the fourth part 12b of the second power line 12 are electrically connected. On the other hand, by operating the fourth contact 422 to be in the open state, the second main coil 122 is not excited. In this case, by causing the second main contact 121 to be in the open state, electrical connection between the third part 12a and the fourth part 12b of the second power line 12 is cut off.

The control device 500, for example, includes the first and second internal contacts 511 and 512, the first and second detection circuits 521 and 522, and an information processing unit 530.

The first internal contact 511 is a make contact for a first control instruction S1 and is operated such that it is brought into a closed state (conductive state) in a case where the first control instruction S1 is output from the information processing unit 530. As a result, the third coil 411 of the first control relay 410 is brought into an excited state. On the other hand, in a case where the first control instruction S1 is not output from the information processing unit 530, the first internal contact 511 is operated such that it is brought into an open state (non-conductive state). As a result, the third coil 411 is not excited.

The second internal contact 512 is a make contact for a second control instruction S2 and is operated such that it is brought into a closed state (conductive state) when the second control instruction S2 is output from the information processing unit 530. As a result, the fourth coil 421 of the second control relay 420 is brought into an excited state. On the other hand, in a case where the second control instruction S2 is not output from the information processing unit 530, the second internal contact 512 is operated such that it is brought into an open state (non-conductive state). As a result, the fourth coil 421 is not excited.

The first detection circuit 521, for example, is an interface circuit including a photo-coupler and includes a light emitting diode connected between the first terminal 521a and the second terminal 521b and a phototransistor disposed in correspondence with this light emitting diode. In a case where a current flows between the first terminal 521a and the second terminal 521b, the first detection circuit 521 outputs a predetermined signal (a first answer A1) to the information processing unit 530.

The second detection circuit 522, for example, is an interface circuit including a photo-coupler and includes a light emitting diode connected between the first terminal 522a and the second terminal 522b and a phototransistor disposed in correspondence with this light emitting diode. In a case where a current flows between the first terminal 522a and the second terminal 522b, the second detection circuit 522 outputs a predetermined signal (a second answer A2) to the information processing unit 530.

The whole or a part of the information processing unit 530, for example, is a software functional unit that is realized as a hardware processor such as a central processing unit (CPU) executing a computer program (software) stored in a memory not illustrated in the drawing. The whole or a part of the information processing unit 530, for example, may be realized by hardware (a circuit unit; including circuitry) such as a large scale integration (LSI), an application specific integrated circuit (ASIC), a programmable logic device (PLD), a field-programmable gate array (FPGA), or the like or may be realized by cooperation between a software functional unit and hardware.

The information processing unit 530, for example, includes a control unit 531 and a diagnosis unit 532.

The control unit 531 outputs control instructions relating to the first main contact 111 and the second main contact 121. For example, in a case where switching of the first main contact 111 from the closed state to the open state is desired, the control unit 531 outputs the first control instruction S1 to the first internal contact 511. In this specification, "outputting a control instruction," for example, in a case where a control instruction is switched between two values including a high level and a low level, means outputting a control instruction of the high level. On the other hand, in a case where switching of the first main contact 111 from the closed state to the open state is desired, the control unit 531 stops outputting of the first control instruction S1 to the first internal contact 511. In this specification, "stopping of the outputting of a control instruction," for example, in a case where the control instruction is switched between two values including the high level and the low level, means outputting a control instruction of the low level. In this specification, a control instruction used for operating the first main contact 111 will be referred to as a "first control instruction S1." The first control instruction S1 is one example of "a control instruction relating to the first main contact 111."

Similarly, in a case where switching of the second main contact 121 from the closed state to the open state is desired, the control unit 531 outputs the second control instruction S2 to the second internal contact 512. On the other hand, in a case where switching of the second main contact 121 from the closed state to the open state is desired, the control unit 531 stops outputting of the second control instruction S2 to the second internal contact 512. In this specification, a control instruction used for operating the second main contact 121 will be referred to as a "second control instruction S2." The second control instruction S2 is one example of "a control instruction relating to the second main contact 121."

The diagnosis unit 532 determines whether an abnormality of the first main contact 111 exists or not based on output of the first control instruction S1 relating to the first main contact 111 and the state of the first diagnostic relay 310. In this embodiment, the diagnosis unit 532 determines whether an abnormality of the first main contact 111 exists or not based on the output of the first control instruction S1 relating to the first main contact 111 and the state of the first contact 312 of the first diagnostic relay 310.

For example, in a case where the first answer A1 is output from the first detection circuit 521 in a state where the first control instruction S1 is output, the diagnosis unit 532 determines that there is no abnormality of the first main contact 111. On the other hand, in a case where the first answer A1 is not output from the first detection circuit 521 in a state where the first control instruction S1 is output, the diagnosis unit 532 determines that there is an abnormality of the first main contact 111.

In addition, in a case where the first answer A1 is not output from the first detection circuit 521 in a state where the output of the first control instruction S1 is stopped, the diagnosis unit 532 determines that there is no abnormality of the first main contact 111. On the other hand, in a case where the first answer A1 is output from the first detection circuit 521 in a state where the output of the first control instruction S1 is stopped, the diagnosis unit 532 determines that there is an abnormality of the first main contact 111.

Similarly, the diagnosis unit 532 determines whether an abnormality of the second main contact 121 exists or not based on output of the second control instruction S2 relating to the second main contact 121 and the state of the second diagnostic relay 320. In this embodiment, the diagnosis unit 532 determines whether an abnormality of the second main contact 121 exists or not based on the output of the second control instruction S2 relating to the second main contact 121 and the state of the second contact 322 of the second diagnostic relay 320.

For example, in a case where the second answer A2 is output from the second detection circuit 522 in a state where the second control instruction S2 is output, the diagnosis unit 532 determines that there is no abnormality of the second main contact 121. On the other hand, in a case where the second answer A2 is not output from the second detection circuit 522 in a state where the second control instruction S2 is output, the diagnosis unit 532 determines that there is an abnormality of the second main contact 121.

In addition, in a case where the second answer A2 is not output from the second detection circuit 522 in a state where the output of the second control instruction S2 is stopped, the diagnosis unit 532 determines that there is no abnormality of the second main contact 121. On the other hand, in a case where the second answer A2 is output from the second detection circuit 522 in a state where the output of the second control instruction S2 is stopped, the diagnosis unit 532 determines that there is an abnormality of the second main contact 121.

Next, the flow of a failure diagnosis operation performed by the information processing unit 530 will be described. FIGS. 2A to 2C are flowcharts illustrating one example of the flow of a diagnosis operation of the information processing unit 530. A reference sign "A" in FIG. 2A is connected to a reference sign "A" in FIG. 2B. A reference sign "B" in FIG. 2A is connected to a reference sign "B" in FIG. 2C. Reference signs "C" and "D" in FIG. 2B are respectively connected to reference signs "C" and "D" in FIG. 2C.

An electric motor not illustrated in the drawing performs a preliminary failure diagnosis for a brake (load L) that is a security system before driving (rotation) for safety. Here, a flow including a preliminary failure diagnosis before driving of the electric motor will be described. First, the information processing unit 530 performs a preliminary failure diagnosis before driving in a state where a brake is applied (a state in which the supply of power from a power supply PS to the load L is stopped) for safety. For this reason, in an initial state, the output of first and second control instructions S1 and S2 are stopped (S90).

In this embodiment, the information processing unit 530, first, determines whether the first and second answers A1 and A2 output from the first and second detection circuits 521 and 522 are present or absent in a state where the output of the first and second control instructions S1 and S2 are stopped (S91). In a case where at least one of the first and second answers A1 and A2 is present in a state where the output of the first and second control instructions S1 and S2 are stopped (S91: No), the information processing unit 530 determines that there is an abnormality (S92). For example, the information processing unit 530 determines that there is an abnormality of the first main contact 111 in a case where the first answer A1 is present. The information processing unit 530 determines that there is an abnormality of the second main contact 121 in a case where the second answer A2 is present. In a case where it is determined that there is an abnormality in at least one of the first main contact 111 and the second main contact 121, the state in which the supply of power to the load L is cut off is continued, and the state in which the brake is applied is continued for securing safety. In addition, the information processing unit 530 outputs a protective interlocking request signal or an abnormality display signal informing of an abnormality in the brake system to a higher-rank device or the like not illustrated in the drawing of (S307; see FIG. 2C). Accordingly, it can be prevented that the electric motor not illustrated in the drawing is driven in a state where the brake system is abnormal.

On the other hand, in a case where both the first and second answers A1 and A2 are absent in a state where the output of the first and second control instructions S1 and S2 are stopped (S91: Yes), the information processing unit 530 determines that there is no abnormality (S93), and the process proceeds to the process of S101. These processes S91 to S93 are one example of a "preliminary diagnosis operation."

Next, the information processing unit 530 operates the first main contact 111 and determines whether an abnormality of the first main contact 111 exists or not. Described in more detail, the information processing unit 530 switches the first internal contact 511 from the open state to the closed state by outputting the first control instruction S1 to the first internal contact 511 (S101). When the first internal contact 511 is brought into the closed state, the third coil 411 of the first control relay 410 is excited. As a result, the third contact 412 of the first control relay 410 is switched from the open state to the closed state. When the third contact 412 is brought into the closed state, the first main coil 112 is excited, and the first main contact 111 is switched from the open state to the closed state. When the first main contact 111 is switched to the closed state, the first coil 311 of the first diagnostic relay 310 is excited. When the first coil 311 is excited, the first contact 312 of the first diagnostic relay 310 is switched from the open state to the closed state, and the first control power line PL1 and the first terminal 521a of the first detection circuit 521 are electrically connected. As a result, the first detection circuit 521 outputs the first answer A1 to the information processing unit 530.

The information processing unit 530 determines whether the first answer A1 output from the first detection circuit 521 is present or absent in a state where the first control instruction S1 is output (S102). In a case where the first answer A1 from the first detection circuit 521 is absent in the state in which the first control instruction S1 is output (S102: No), the information processing unit 530 determines that there is an abnormality of the first main contact 111 (S103) and stops the output of the first control instruction S1 (S104). In this way, the state in which the supply of power to the load L is cut off is continued, and the state in which the brake is applied is continued, whereby it is achieved to secure safety. In addition, the information processing unit 530 outputs the protective interlocking request signal or the abnormality display signal informing of an abnormality in the brake system to the higher-rank device or the like not illustrated in the drawing (S307). Accordingly, it can be prevented that the electric motor not illustrated in the drawing is driven in a state where the brake system is abnormal.

On the other hand, in a case where the first answer A1 from the first detection circuit 521 is present in a state where the first control instruction S1 is output (S102: Yes), the information processing unit 530 determines that there is no abnormality of the first main contact 111 (S105), and the process proceeds to the next process. These processes S101 to S105 are one example of "a first diagnosis operation."

In a case where no abnormality is detected in the first diagnosis operation, the information processing unit 530 stops the output of the first control instruction S1 for switching the first main contact 111 to the open state (S111). As a result, the first internal contact 511 is switched to the open state. When the first internal contact 511 is brought into the open state, the third coil 411 is not excited, and the third contact 412 of the first control relay 410 is switched to the open state. When the third contact 412 is brought into the open state, the first main coil 112 is not excited, and the first main contact 111 is switched to the open state. When the first main contact 111 is switched to the open state, the first coil 311 is not excited. When the first coil 311 is not excited, the first contact 312 is switched to the open state, and the electrical connection between the first control power line PL1 and the first terminal 521a of the first detection circuit 521 is cut off. As a result, the first detection circuit 521 stops the output of the first answer A1.

The information processing unit 530 determines whether the first answer A1 output from the first detection circuit 521 is present or absent in a state where the output of the first control instruction S1 is stopped (S112). In a case where the first answer A1 from the first detection circuit 521 is present in the state in which the output of the first control instruction S1 is stopped (S112: No), the information processing unit 530 determines that there is an abnormality of the first main contact 111 (S113). In addition, the information processing unit 530 outputs the protective interlocking request signal or the abnormality display signal informing of an abnormality in the brake system to the higher-rank device or the like not illustrated in the drawing (S307). Accordingly, there is no continuation of the driving of the electric motor not illustrated in the drawing in a state where the brake system is abnormal, and safety is secured.

On the other hand, in a case where the first answer A1 from the first detection circuit 521 is absent in the state in which the output of the first control instruction S1 is stopped (S112: Yes), the information processing unit 530 determines that there is no abnormality of the first main contact 111 (S114), and the process proceeds to the next process. These processes S111 to S114 are one example of a "second diagnosis operation."

Next, the information processing unit 530 operates the second main contact 121 and determines whether an abnormality of the second main contact 121 exists or not. Described in more detail, the information processing unit 530 switches the second internal contact 512 from the open state to the closed state by outputting the second control instruction S2 to the second internal contact 512 (S201). When the second internal contact 512 is brought into the closed state, the fourth coil 421 of the second control relay 420 is excited. As a result, the fourth contact 422 of the second control relay 420 is switched from the open state to the closed state. When the fourth contact 422 is brought into the closed state, the second main coil 122 is excited, the second main contact 121 is switched from the open state to the closed state, and the first control power line PL1 and the first terminal 522a of the second detection circuit 522 are electrically connected. As a result, the second detection circuit 522 outputs the second answer A2 to the information processing unit 530.

The information processing unit 530 determines whether the second answer A2 output from the second detection circuit 522 is present or absent in a state where the second control instruction S2 is output (S202). In a case where the second answer A2 from the second detection circuit 522 is absent in the state in which the second control instruction S2 is output (S202: No), the information processing unit 530 determines that there is an abnormality of the second main contact 121 (S203) and stops the output of the second control instruction S2 (S204). Accordingly, the state in which the supply of power to the load L is cut off is continued, and the state in which the brake is applied is continued, whereby safety is secured. In addition, the information processing unit 530 outputs the protective interlocking request signal or the abnormality display signal informing of an abnormality in the brake system to the higher-rank device or the like not illustrated in the drawing (S307). Accordingly, there is no continuation of the driving of the electric motor not illustrated in the drawing in a state where the brake system is abnormal, and safety is secured.

On the other hand, in a case where the second answer A2 from the second detection circuit 522 is present in the state in which the second control instruction S2 is output (S202: Yes), the information processing unit 530 determines that there is no abnormality of the second main contact 121 (S205), and the process proceeds to the next process. These processes S201 to S205 are one example of a "third diagnosis operation."

In a case where no abnormality is detected in the third diagnosis operation, the information processing unit 530 stops the output of the second control instruction S2 for switching the second main contact 121 to the open state (S211). As a result, the second internal contact 512 is switched to the open state. When the second internal contact 512 is brought into the open state, the fourth coil 421 is not excited, and the fourth contact 422 of the second control relay 420 is switched to the open state. When the fourth contact 422 is brought into the open state, the second main coil 122 is not excited, and the second main contact 121 is switched to the open state. When the second main contact 121 is switched to the open state, the second coil 321 is not excited. When the second coil 321 is not excited, the second contact 322 is switched to the open state, and the electrical connection between the first control power line PL1 and the first terminal 522a of the second detection circuit 522 is cut off. As a result, the second detection circuit 522 stops the output of the second answer A2.

The information processing unit 530 determines whether the second answer A2 output from the second detection circuit 522 is present or absent in a state where the output of the second control instruction S2 is stopped (S212). In a case where the second answer A2 from the second detection circuit 522 is present in the state in which the output of the second control instruction S2 is stopped (S212: No), the information processing unit 530 determines that there is an abnormality of the second main contact 121 (S213). In addition, the information processing unit 530 outputs the protective interlocking request signal or the abnormality display signal informing of an abnormality in the brake system to the higher-rank device or the like not illustrated in the drawing (S307). Accordingly, there is no continuation of the driving of the electric motor not illustrated in the drawing in a state where the brake system is abnormal, and safety is secured.

On the other hand, in a case where the second answer A2 from the second detection circuit 522 is absent in the state in which the output of the second control instruction S2 is stopped (S212: Yes), the information processing unit 530 determines that there is no abnormality of the second main contact 121 (S214), and the process proceeds to the next process. These processes S211 to S214 are one example of a "fourth diagnosis operation."

In a case where an abnormality has not been detected in the preliminary diagnosis operation and the first to fourth diagnosis operations described above, the information processing unit 530 causes both the first and second main contacts 111 and 121 to be in the closed state by outputting both the first and second control instructions S1 and S2 (S301). Accordingly, power is supplied from the power supply PS to the load L, the load L is driven, and the brake is released. Next, the information processing unit 530 determines whether both the first and second answers A1 and A2 from the first and second detection circuits 522 are present or absent in a state where both the first and second control instructions S1 and S2 are output (S302). In a case where at least one of the first and second answers A1 and A2 is absent in the state in which the first and second control instructions S1 and S2 are output (S302: No), the information processing unit 530 determines that there is an abnormality in at least one of the first and second main contacts 111 and 121 (S303), stops the output of the first and second control instructions S1 and S2 (S304), and cuts off the supply of power from the power supply PS to the load L. Accordingly, a state in which the brake is applied is formed. In addition, the information processing unit 530 outputs the protective interlocking request signal or the abnormality display signal informing of an abnormality in the brake system to the higher-rank device or the like not illustrated in the drawing (S307). Accordingly, there is no continuation of the driving of the electric motor not illustrated in the drawing in a state where the brake system is abnormal, and safety is secured.

On the other hand, in a case where both the first and second answers A1 and A2 are present in the state in which the first and second control instructions S1 and S2 are output (S302: Yes), the information processing unit 530 determines that there is no abnormality in both the first and second main contacts 111 and 121 (S305). In a case where there is no abnormality in the first and second main contacts 111 and 121, the information processing unit 530 determines whether an instruction for stopping the supply of power from the power supply PS to the load L (in other words, a brake instruction) (S306) is present or absent and repeats the operation of S302 at a predetermined sampling period until there is the instruction for stopping the supply of power. In this way, the states of the first and second main contacts 111 and 121 are constantly monitored.

According to such a configuration, the reliability of a diagnosis of a failure can be improved. For example, in recent years, complication of an electronic system based on a microprocessor has progressed, and possibility of occurrence of a failure and an abnormal operation that are unexpected is increasing. For this reason, a function for constantly monitoring a device and safely stopping the device at the time of detection of an abnormality becomes more important.

Here, as a comparative example, a monitoring device detecting an abnormality in a device by monitoring the state of an auxiliary contact disposed in correspondence with a main contact will be considered. In such a device, for example, in a case where welding (adherence) occurs in any one of the main contact and the auxiliary contact, a difference between the state of the main contact and the state of the auxiliary contact occurs, and there is a likeliness of decreasing the accuracy of failure diagnosis. In such a case, although a contactor capable of detecting welding of a contact may be used as a countermeasure thereof, it leads to restrictions on components and an increase in cost.

Thus, in the failure diagnosis system 1 according to this embodiment, for example, by disposing the first diagnostic relay 310 that is independent from the first main contact 111 and monitoring matching between the first control instruction relating to the first main contact 111 and the first answer A1 acquired based on the state of the first diagnostic relay 310, the presence/absence of an abnormality in the first main contact 111 is detected. According to such a configuration, even in a case where welding occurs in any one of the main contact and the auxiliary contact, it is difficult for the accuracy of failure diagnosis to decrease. For this reason, the reliability of failure diagnosis can be higher than that of a monitoring device that monitors the state of an auxiliary contact. In addition, according to this embodiment, since the reliability of failure diagnosis can be improved without using a contactor capable of detecting welding of a contact, cost-down of the device is easily achieved.

In this embodiment, a preliminary diagnosis operation for determining presence/absence of an abnormality of the first main contact 111 based on the state of the first contact 312 of the first diagnostic relay 310 in a state where the first control instruction S1 is stopped for causing the first main contact 111 to be in the open state is performed, after the preliminary diagnosis operation, the first diagnosis operation for determining presence/absence of an abnormality of the first main contact 111 based on the state of the first contact 312 of the first diagnostic relay 310 in a state where the first control instruction S1 is output is performed, and, after the first diagnosis operation, the second diagnosis operation for determining presence/absence of an abnormality of the first main contact 111 based on the state of the first contact 312 of the first diagnostic relay 310 in a state where the output of the first control instruction S1 is stopped is performed. According to such a configuration, an abnormality diagnosis is separately performed in the initial state, the closed state, and the open state of the first main contact 111. Accordingly, the reliability of failure diagnosis can be further improved.

In this embodiment, the failure diagnosis system 1 further includes the third connecting line 23, the first control relay 410, and the first main coil 112. The third connecting line 23 includes the first part 23a electrically connected to the first part 11a of the first power line 11 and the second part 23b electrically connected to the third part 12a of the second power line 12. The first control relay 410 includes the third contact 412 disposed between the first part 23a and the second part 23b of the third connecting line 23 and the third coil 411 that is excited and switches the third contact 412 to be in the conductive state in a case where the first control instruction S1 is output. The first main coil 112 is disposed between the first part 23a and the second part 23b of the third connecting line 23 and is excited and switches the state of the first main contact 111 in a case where the third contact 412 is switched to the conductive state. According to such a configuration, the size of a coil excited using the first control line 211 can be configured to be smaller than that of a case in which the first main coil 112 is disposed in the first control line 211 (to be described later as a second embodiment). Accordingly, a decrease in the size of the device can be achieved.

In this embodiment, the first main contact 111, the second main contact 121, the third contact 412, and the fourth contact 422 are configured as make contacts. According to such a configuration, the supply of power to the load L at the time of occurrence of a failure can be cut off more reliably. In this way, the safety of the device can be further improved.

Modified Example

Figure 3:
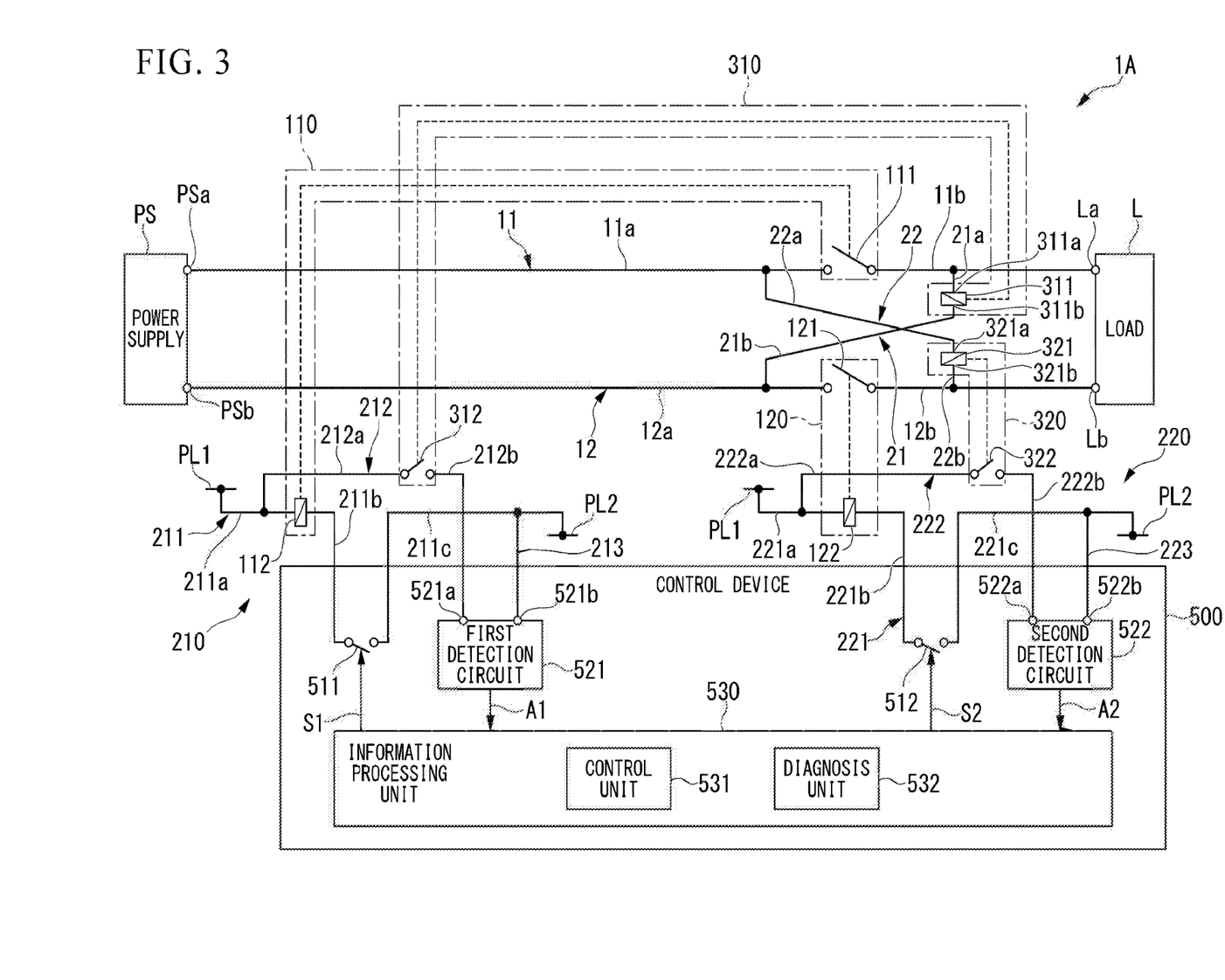
FIG. 3 is a configuration diagram illustrating a failure diagnosis system according to a modified example of the embodiment.

Next, a modified example of the embodiment described above will be described. In this modified example, a first main coil 112 of a first contactor 110 is disposed in the first control line 211, and a second main coil 122 of a second contactor 120 is disposed in the fourth control line 221, which is different from the embodiment described above. In addition, components other than those described below are similar to those according to the embodiment described above.

FIG. 3 is a configuration diagram illustrating a failure diagnosis system 1A according to this modified example. In the failure diagnosis system 1A according to this modified example, the third connecting line 23, the fourth connecting line 24, the first control relay 410, and the second control relay 420 are not disposed. Instead of these, the first main coil 112 of the first contactor 110 is disposed between the first part 211a and the second part 211b of the first control line 211, and the second main coil 122 of the second contactor 120 is disposed between the first part 221a and the second part 221b of the fourth control line 221. In this modified example, when the first control instruction S1 is output, and a current flows through (a voltage is applied to) the first control line 211, the first main coil 112 is excited, and the state of the first main contact 111 is switched. Similarly, when the second control instruction S2 is output, and a current flows through (a voltage is applied to) the fourth control line 221, the second main coil 122 is excited, and the state of the first main contact 111 is switched.

According to such a configuration, similar to the embodiment described above, the accuracy of failure diagnosis can be improved.

As above, the embodiment and the modified example have been described. However, the embodiment is not limited to the example described above. For example, the second diagnostic relay 320, the second control relay 420, the second detection circuit 522, and the like may be omitted. In other words, the failure diagnosis systems 1 and 1A may have only a configuration for determining the presence/absence of an abnormality of the first main contact 111.

According to at least one embodiment described above, by diagnosing the presence/absence of an abnormality of the first main contact based on output of a control instruction relating to the first main contact and a state of an electrical component connected to a connecting line, the reliability of failure diagnosis can be improved.

While several embodiments of the present invention have been described, such embodiments are presented as examples and are not for the purpose of limiting the scope of the invention. These embodiments may be executed in other various forms, and various omissions, substitutions, and changes may be made in a range not departing from the concept of the invention. These embodiments and modifications thereof similarly belong to the scope of the invention described in the claims and a scope equivalent thereto as long as they are included in the range and the concept of the invention.

REFERENCE SIGNS LIST 1, 1A Failure diagnosis system
11 First power line

11a First part
11b Second part
12 Second power line
12a Third part
12b Fourth part
21 First connecting line
22 Second connecting line
23 Third connecting line
24 Fourth connecting line
111 First main contact
112 First main coil
121 Second main contact
122 Second main coil
310 First diagnostic relay (first electrical component; first relay)
311 First coil
312 First contact
320 Second diagnostic relay (second electrical component; second relay)
321 Second coil
322 Second contact
411 Third coil
412 Third contact
421 Fourth coil
422 Fourth contact
500 Control device
PS Power supply
L Load

The invention claimed is:

1. A failure diagnosis system comprising:
a first power line comprising a first part and a second part, the first part being to be electrically connected to a power supply, the second part being to be electrically connected to a load;
a second power line comprising a third part and a fourth part, the third part being to be electrically connected to the power supply, the fourth part being to be electrically connected to the load;
a first main contact disposed between the first part and the second part of the first power line;
a second main contact disposed between the third part and the fourth part of the second power line;
a first electrical component comprising a first terminal and a second terminal, the first terminal being electrically connected to the second part of the first power line, the second terminal being electrically connected to the third part of the second power line, a state of the first electrical component being to be switched in a case where a voltage is applied between the first terminal and the second terminal;
a second electrical component comprising a third terminal and a fourth terminal, the third terminal being electrically connected to the first part of the first power line, the fourth terminal being electrically connected to the fourth part of the second power line, a state of the second electrical component being to be switched in a case where a voltage is applied between the third terminal and the fourth terminal; and
a control device configured to determine whether an abnormality of the first main contact exists or not based on output of a first control instruction relating to the first main contact and the state of the first electrical component, and to determine whether an abnormality of the second main contact exists or not based on output of a second control instruction relating to the second main contact and the state of the second electrical component, wherein the first electrical component is a first relay, the first relay comprising a coil and a contact, the coil being to be excited in a case where the voltage is applied between the first terminal and the second terminal, a state of the contact being to be switched in a case where the coil is excited,
the control device is configured to determine whether the abnormality of the first main contact exists or not based on the output of the first control instruction and the state of the contact of the first relay,
the control device is configured to perform a preliminary diagnosis operation for determining whether the abnormality of the first main contact exists or not based on the state of the contact of the first relay in a state where the first control instruction is stopped for causing the first main contact to be brought into an open state, and to perform, after the preliminary diagnosis operation, a first diagnosis operation for determining whether the abnormality of the first main contact exists or not based on the state of the contact of the first relay in a state where the first control instruction is output for causing the first main contact to be brought into a closed state, and
the control device is configured to perform, after the first diagnosis operation, a second diagnosis operation for determining whether the abnormality of the first main contact exists or not based on the state of the contact of the first relay in a state where the first control instruction is stopped for causing the first main contact to be brought into the open state.

2. The failure diagnosis system according to claim 1, wherein
the load is a stopping device that safely stops a device in a case where supply of power from the power supply is cut off, and
the first main contact and the second main contact are make contacts.

3. The failure diagnosis system according to claim 2, further comprising:
a connecting line comprising a first part and a second part, the first part being electrically connected to the first part of the first power line, the second part being electrically connected to the third part of the second power line;
a second relay comprising a contact and a coil, the contact being a make contact disposed between the first part of the connecting line and the second part of the connecting line, the coil being to be excited for switching the contact to a conductive state in a case where the first control instruction is output; and
a first main coil disposed between the first part of the connecting line and the second part of the connecting line, the first main coil being to be excited for switching the state of the first main contact in a case where the contact of the second relay is switched to the conductive state.

4. A failure diagnosis system comprising:
a first power line comprising a first part and a second part, the first part being to be electrically connected to a power supply, the second part being to be electrically connected to a load;
a second power line comprising a third part and a fourth part, the third part being to be electrically connected to the power supply, the fourth part being to be electrically connected to the load;
a first main contact disposed between the first part and the second part of the first power line;

a second main contact disposed between the third part and the fourth part of the second power line;

a first electrical component comprising a first terminal and a second terminal, the first terminal being electrically connected to the second part of the first power line, the second terminal being electrically connected to the third part of the second power line, a state of the first electrical component being to be switched in a case where a voltage is applied between the first terminal and the second terminal;

a second electrical component comprising a third terminal and a fourth terminal, the third terminal being electrically connected to the first part of the first power line, the fourth terminal being electrically connected to the fourth part of the second power line, a state of the second electrical component being to be switched in a case where a voltage is applied between the third terminal and the fourth terminal; and a control device configured to determine whether an abnormality of the first main contact exists or not based on output of a first control instruction relating to the first main contact and the state of the first electrical component, and to determine whether an abnormality of the second main contact exists or not based on output of a second control instruction relating to the second main contact and the state of the second electrical component, wherein the load is a stopping device that safely stops a device in a case where supply of power from the power supply is cut off, the first main contact and the second main contact are make contacts, and the load is a brake unit that stops an electric motor.

* * * * *